United States Patent [19]

Brulle

[11] 4,410,806
[45] Oct. 18, 1983

[54] CONTROL SYSTEM FOR A VERTICAL AXIS WINDMILL

[75] Inventor: Robert V. Brulle, St. Louis County, Mo.

[73] Assignee: The United States of America as represented by the U.S. Department of Energy, Washington, D.C.

[21] Appl. No.: 298,990

[22] Filed: Sep. 3, 1981

[51] Int. Cl.³ .............................. F03D 7/00; H02P 9/04
[52] U.S. Cl. ........................................ 290/44; 290/55; 416/17; 416/35; 416/115
[58] Field of Search ..................... 290/43, 44, 54, 55; 416/17, 119, 35, 37, 115

[56] References Cited

U.S. PATENT DOCUMENTS 3,902,072  8/1975  Quinn .................................. 416/119
4,168,439  9/1979  Palma .................................. 290/44

Primary Examiner—J. V. Truhe
Assistant Examiner—Shelley Wade
Attorney, Agent, or Firm—George H. Libman; Albert Sopp; Richard G. Besha

[57] ABSTRACT

A vertical axis windmill having a rotating structure is provided with a series of articulated vertical blades whose positions are controlled to maintain a constant RPM for the rotating structure, when wind speed is sufficient. A microprocessor controller is used to process information on wind speed, wind direction and RPM of the rotating structure to develop an electrical signal for establishing blade position. The preferred embodiment of the invention, when connected to a utility grid, is designed to generate 40 kilowatts of power when exposed to a 20 mile per hour wind. The control system for the windmill includes electrical blade actuators that modulate the blades of the rotating structure. Blade modulation controls the blade angle of attack, which in turn controls the RPM of the rotor. In the preferred embodiment, the microprocessor controller provides the operation logic and control functions. A wind speed sensor provides inputs to start or stop the windmill, and a wind direction sensor is used to keep the blade flip region at 90° and 270° to the wind. The control system is designed to maintain constant rotor RPM when wind speed is between 10 and 40 miles per hour.

9 Claims, 15 Drawing Figures

```
TRL=   00   RPM SENSOR PERIOD REFERENCE (TWO BYTES)
TRH=   01        33.5 RPM = HEX 3699.
TNL=   02   RPM SENSOR NOW VALUE   (TWO BYTES)
TNH=   03
TPL=   04   RPM SENSOR PREVIOUS VALUE (TWO BYTES)
TPH=   05
TDL=   06   RPM SENSOR DELTA TIME PERIOD (TWO BYTES)
TDH=   07
TEL=   08   RPM SENSOR TIME ERROR (TWO BYTES)
TEH=   09
TERR=  0A   TEH & TEL ADJUSTED TO ONE BYTE
TDEL=  0B   TDH & TDL ADJUSTED TO ONE BYTE
KMTE=  0C   TERR MULTIPLIER CONSTANT
KMTD=  0D   TDEL MULTIPLIER CONSTANT
KMPR=  0E   TERR AND TDEL MULTIPLIER CONSTANT
BSLL=  0F   BLADE SPEED RATIO LIMIT (TWO BYTES)
BSLH=  10
BSDL=  11   BLADE SPEED RATIO DELTA (TWO BYTES)
BSDH=  12   BSD = KMPR((KMTE)(TERR)+(KMTD)(TDEL))
BSL=   13   BLADE SPEED RATIO DELTA SUMMATION (TWO BYTES)
BSH=   14
CAM=   15   CAM ROCK ANGLE LEVEL & FRACTION POINTER
REF00= 16   A/D INPUT LOW REFERENCE
RCKF1= 17   A/D INPUT RCK ANGLE FEEDBACK ACTUATOR 1.
RCKF2= 18   A/D INPUT RCK ANGLE FEEDBACK ACTUATOR 2.
RCKF3= 19   A/D INPUT RCK ANGLE FEEDBACK ACTUATOR 3.
RCKT1= 1A   A/D INPUT D/A FEEDBACK OF RCKC1.
RCKT2= 1B   A/D INPUT D/A FEEDBACK OF RCKC2.
RCKT3= 1C   A/D INPUT D/A FEEDBACK OF RCKC3.
WDIR1= 1D   A/D INPUT WIND DIRECTION POT 1.
WDIR2= 1E   A/D INPUT WIND DIRECTION POT 2 (IF USED).
POTR1= 1F   A/D INPUT ROTOR POSITION POT 1.
POTR2= 20   A/D INPUT ROTOR POSITION POT 2 (180°)
REFIO= 21   A/D INPUT +10 VOLT REFERENCE INPUT
WVEL=  22   A/D INPUT WIND VELOCITY
TNAH=  23   MSH OF RPM SENOR PERIOD (ACTUAL VALUE)
PHASE= 24   CONTROLLER OPERATING PHASE CODE
PSIN=  25   PSI NOW VALUE = ROTOR POSITION-WIND DIRECTION.
PSIP=  26   PSI PREVIOUS VALUE.
RCKC1= 27   ROCK ANGLE COMMAND TO ACTUATOR 1.
RCKC2= 28   ROCK ANGLE COMMAND TO ACTUATOR 2.
RCKC3= 29   ROCK ANGLE COMMAND TO ACTUATOR 3.
SENS1= 2A   DIP SWITCH #1 INPUT.
SENS2= 2B   DIP SWITCH #2 INPUT
REVA=  2C   ROTOR ANGLE AT START OF REVP=0 TIME.
REVP=  2D   ROTOR ANGLE MEAS PERIOD TO DETERMINE ANALOG RPM
REVT=  2E   ROTOR ANGLE TIME PERIOD FOR 140 DEGREES.
LEAD=  2F   PSI LEAD ANGLE FOR RCKC.
BSCM=  30   BLADE SPEED RATIO FROM TBLBSP.
BSFL=  31   FINAL LAMBDA ADJ BY LIMITS LSH.
DSFH=  32   FINAL LAMBDA ADJ BY LIMITS MSH.

PRODL = 33  PRODUCT LSH
PRODH = 34  PRODUCT MSH
RCKFA = 35  ACTUATOR 1 ERROR COUNT
RCKFB = 36  ACTUATOR 2 ERROR COUNT
RCKFC = 37  ACTUATOR 3 ERROR COUNT
CTRAH = 38  CTRA MSH
CTRAL = 39  CTRA LSH
CTRBH = 3A  CTRB MSH
CTRBL = 3B  CTRB LSH
STCKB = 6F  BOTTOM OF DATA STACK.
```

FIG.13.

| NO-GO | DESCRIPTION |
|---|---|
| ROTOR POT PROBLEM | OPEN OR SHORT IN ROTOR POTENTIOMETERS SHUTS DOWN SYSTEM. |
| ROTOR POT RPM VS RPM SENSOR ERROR. | ROTOR RPM DERIVED BY DIFFERENTIATING ROTOR POTENTIOMETER POSITION WITH RESPECT TO TIME IS COMPARED TO MEASURED RPM FROM MAGNETIC GEAR TEETH COUNTER SENSOR. COMPARISON ERROR SHUTS DOWN SYSTEM. |
| ROCK ANGLE READ FROM CAM CURVES VS ROCK ANGLE COMMAND ERROR | CHECKS TO MAKE SURE THAT THE ROCK ANGLE READ FROM THE CAM PROFILES (FIGURE 3) IS ACTUALLY THE VALUE SENT TO THE ACTUATORS AS ROCK ANGLE COMMAND. |
| ROCK ANGLE FEEDBACK MONITOR | THIS CHECK COMPARES THE ROCK ANGLE FEEDBACK FROM THE ACTUATOR WITH THE ROCK ANGLE COMMAND GENERATED 0.077 SEC. EARLIER. IF THEY DO NOT COMPARE SYSTEM IS SHUT DOWN. |
| REAL TIME CLOCK FLAG ERROR | INITIAL DIAGNOSTIC CHECK OF THE ELECTRONICS TO MAKE SURE REAL TIME CLOCK IS OPERATING CORRECTLY. |
| PHASE 2 TIME OUT ERROR OR PHASE 2 + PHASE 2A ERROR. | IF IT TAKES LONGER THAN A SPECIFIED TIME AFTER START UP TO GET FORWARD ROTOR MOTION AND FIRST RPM SENSOR FLAG, SYSTEM IS SHUT DOWN. |
| RPM SENSE FLAG DOES NOT SET OR DOES NOT RESET | INITIAL DIAGNOSTIC CHECK TO MAKE SURE RPM ELECTRONICS ARE WORKING CORRECTLY. |
| PHASE 4 RPM SENSOR CHECK | WHEN ROTOR IS AT SYC SPEED AN RPM UPDATE SHOULD OCCUR EVERY 0.058 SECOND. IF IT TAKES LONGER THAN 0.064 SECOND TO GET AN UPDATE, SYSTEM IS SHUT DOWN SINCE THE RPM SENSOR COULD HAVE FAILED. |
| PHASE 5 AND 6 TIME OUT | IF IT TAKES LONGER THAN A SPECIFIED TIME FOR THE ROTOR TO COAST DOWN TO RESTART RPM FROM AN OVERSPEED, THE SYSTEM IS SHUT DOWN. |
| ALLOWABLE NUMBER OF OVERSPEED SHUT OFF IS EXCEEDED | AND OVERSPEED DUE TO A LARGE WIND GUST CAN OCCUR. HOWEVER, IF MORE THAN FIVE OCCUR DURING A RUN PERIOD THE SYSTEM IS SHUT DOWN. |

FIG. 14.

| PHASE | RPM RANGE | ACTUATOR POWER | GRID CONNECT | NEXT PHASE | CONDITIONS FOR GOING TO NEXT PHASE | TIME LIMIT | SHUTDOWN CONDITIONS |
|---|---|---|---|---|---|---|---|
| 0 | — | OFF | NO | 1 | PROCESSOR POWER TURN ON | — | — |
| 1 | — | OFF | NO | 2 | INITIALIZE COMPLETE AND SELF-TEST GO | — | SELF TEST FAILURE |
| 2 | $\omega < 7$ RPM | ON | NO | 2A | ROTOR HAS FORWARD ROTATION | 120 SEC | TIME LIMIT |
| 2A | $\omega < 7$ RPM | ON | NO | 3 | FIRST RPM SENSOR FLAG | | TIME LIMIT |
| 3 | $\omega < 32.92$ RPM | ON | NO | 6 | TIME LIMIT | | RPM FROM RPM SENSOR $\neq$ RPM FROM ROTOR ANGLE POT |
| | | | | 4 | $\omega > 32.92$ RPM | | |
| 4 | $32.92 < \omega < 33.83$ | ON | YES | 3 | $\omega < 32.92$ | NO LIMIT | RPM SENSOR FLAG PERIOD $> 64$ MILLISECONDS |
| | | | | 5 | $\omega > 33.83$ RPM | | |
| 5 | $33.83 > \omega > 33.92$ | OFF | YES | 6 | $\omega < 32.92$ RPM | 60 SEC | TIME LIMIT |
| 6 | $32.92 > \omega > 15$ RPM | OFF | NO | 3 | $\omega < 15$ RPM | | TIME LIMIT OR PHASE 6 $\rightarrow$ PHASE 3 LOOP COUNT $> 5$ |

FIG. 15.

CONTROL SYSTEM FOR A VERTICAL AXIS WINDMILL

BACKGROUND OF THE INVENTION

The U.S. government has rights in this invention pursuant to subcontract PF64100F with McDonnell Douglas Corporation under Rockwell International Contract DE-AC04-76DP03533 with the U.S. Department of Energy.

This invention relates to windmill design, and more particularly, to a vertical axis windmill. While the invention is described with particular reference to a windmill having a 40 kilowatt generating capacity, those skilled in the art will recognize the wider applicability of the inventive concepts disclosed hereinafter.

In the past, little effort has been spent in the research and development of windmill structures in general, and vertical axis windmills in particular. Commencing in 1974, a date coincident with the first supply crisis associated with hydrocarbon energy supplies, alternative sources of power generation have blossomed into viable supply sources as their cost per unit basis and unrestricted availability make them substantially more attractive. Power obtained from the wind has long intrigued man. Since 1974, considerable effort has been made to develop wind power electrical generating sources, at least as supplemental to more conventional electrical power generators. Most of this work has involved horizontal axis machines. A horizontal axis machine, as will be appreciated by those skilled in the art, conventionally includes a wind impeller mounted to a shaft which directly drives a generating device. While horizontal axis machines work for their intended purpose, they are not without problems in their application. For example, horizontal axis machines require a yaw control system to keep the relatively heavy horizontal shaft and generator assembly of the machine turned into the wind. The requirement for turning the machine into the wind also complicates the transfer of power to ground level. In addition, horizontal axis machines tend to be very noisy when operated, a problem not encountered with vertical axis windmills. I also am aware of tests that indicated that vertical axis machines have a higher wind energy conversion efficiency than horizontal axis machines.

Although reference is made herein both to constructional features and the physical structure of the windmill, additional information concerning both the structure and other features of the windmill of this invention may be found in a co-pending application Ser. No. 299,236, filed Sept. 3, 1981 and now abandoned, and assigned to the assignee of the present invention, which is incorporated by reference herein.

The invention disclosed herein is primarily concerned with a vertical axis windmill which is designed to operate at a near constant RPM over a wind speed range, i.e., between 10 and 40 miles per hour. The controller unit is used to process information on wind speed, wind direction and RPM of the rotating structure of the windmill to establish blade position signals. Electrical actuators operate upon receipt of the signals generated by the control unit to modulate or position the blades properly, that positioning in turn controlling the RPM of the rotating structure. The control unit provides the operational logic and control functions. It in turn derives inputs from a wind speed sensor which are utilized to determine when to start and stop the windmill. A wind direction sensor also is employed in order to maintain the blade flip region at 90° and 270° with respect to the wind. Blade flip is used herein in its conventional sense, and means that the electrical signals to the blade actuator must be "reversed" or "flipped" on the downwind side of one revolution of the rotating structure, and then reversed again if in the upwind side in order to have proper operation of the rotating structure. The system is powered by a self-contained battery operated power source, which is charged during operation of the windmill.

The system described herein is capable of economically competing with power generation of more conventional form and is designed to have long life in stand alone configurations.

SUMMARY OF THE INVENTION

In accordance with this invention, generally stated, a vertical axis windmill having a rotatable structure or rotor is provided which includes a series of articulated vertical blades. The angle of the blade with relation to the wind is modulated to maintain a near constant RPM when sensed wind speed is within a predetermined range. A controller unit processes information on wind speed, wind direction and RPM of the rotor to establish the blade position signals, defined for the purposes of this specification as rock angle commands. Electric actuators receive these signals and operate to modulate the blades to the correct position. Blade position in turn controls RPM of the rotor. In the preferred embodiment, the controller includes a rock angle filter for smoothing the commands and a system for advancing the rock angle commands so that the modulating command corresponds to the desired blade position. The controller also is designed to account for the blade induced flow effects so that the blade is positioned properly both in downwind and upwind positions during the rotational cycle. The controller also includes a special start-up circuit which monitors wind speed to preclude false starts of the windmill.

One of the objects of this invention is to provide an improved wind powered generating device.

Another object of this invention is to provide a vertical axis windmill which has articulated blades.

Another object of this invention is to provide a control system for a windmill which can monitor a plurality of signal functions to position the blades of a vertical axis windmill properly in response to those conditions.

Another object of this invention is to provide a control scheme for a windmill which reduces low wind false starts.

Another object of this invention is to provide a control system for a vertical axis windmill which employs blade rock angle profiles accounting for the non-linear induced flow field effects which permits efficient rotor operation at a constant RPM.

Another object of this invention is to provide a windmill device which may be operatively controlled to provide either a mechanical or an electrical output.

Another object of this invention is to provide a rotor for vertical axis windmill having movable blades that may be positioned based on rock angle profiles generated either electrically or mechanically.

Other objects of this invention will be apparent to those skilled in the art in light of the following description and accompanying drawings.

BRIEF DESCRIPTION OF THE DRAWINGS

In the drawings,

FIG. 14 is a chart indicating various no-go features incorporated in the control system of this invention; and FIG. 15 is a chart summarizing the operation phase sequence of the processor shown in FIG. 6.

DESCRIPTION OF THE PREFERRED EMBODIMENT

Figures 1, 2, 3:
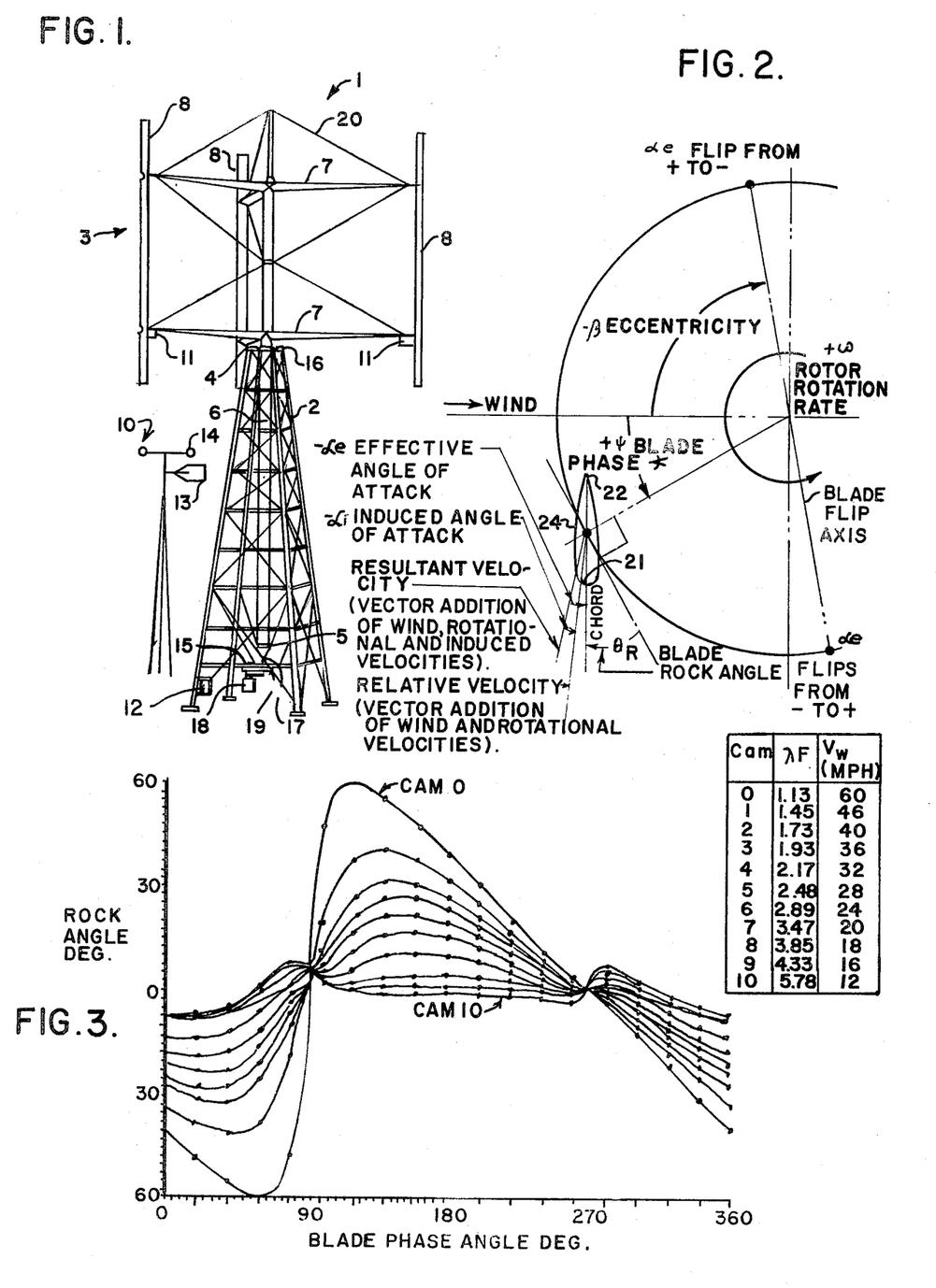
FIG. 1 shows one illustrative embodiment of windmill of this invention.
FIG. 2 is a diagrammatic view defining various parameters which are useful in describing the operation of the invention disclosed hereinafter.
FIG. 3 is a graph showing one illustrative set of rock angle profiles used in conjunction with the windmill of FIG. 1.

Referring now to FIG. 1, reference numeral 1 indicates one illustrative embodiment of windmill of this invention. The windmill 1 includes a supporting structure 2 and a rotating structure or rotor 3 rotatably mounted to the structure 2 by any convenient method. In the embodiment illustrated, a center column 6 is rotatable mounted to the structure 2 along an upper bearing 4 and a lower bearing 5. The center column 6 is connected to a suitable electrical generator 18 through a mechanical connection means in the form of gears 19 or associated like devices. The generator can be replaced with a gear box so that both electrical and mechanical outputs from the rotor 3 may be accomplished through the center column 6.

Rotor 3 includes a plurality of spars or support arms 7. The spars 7 are attached the center column 6 at one end and are operatively coupled to a plurality of blades 8 at a second end. Additional support wires 20 are installed to provide structural rigidity to the support arms 7.

The blades 8 are movably mounted on the spars 7 for articulation, as later described. The blades 8 are aerodynamically designed for efficient operation of the rotor 3 and include a leading edge 21, a trailing edge 22, and a body area 24.

A blade actuator 11 operatively connects each blade 8 at one of the spars 7 so that movement or articulation of the blades is permitted, the blades being under positive control of the actuators 11 during operation of the windmill 1. The actuators 11 preferably are conventional DC servo rotary actuators, for example.

Located either near to or on the support structure 2 are suitable wind instruments 10 which are utilized to obtain wind direction and velocity. As indicated previously, additional details concerning the windmill 1 are contained in a co-pending application Ser. No. 299,236, filed Sept. 3, 1981, and those details ae intended to be incorporated by reference herein.

The parameters commonly used in the operation of the windmill 1 are shown and defined in FIG. 2. FIG. 2, as indicated, is a diagrammatic view of a single blade and the factors which are defined with respect to it in order to control blade position. The rotor 3 rotates counterclockwise, as viewed in top plan view. The blades are at a relative position or angle of attack defined as $-\alpha_e$ during the upwind portion of the rotor rotation, and at $+\alpha_e$ on the downwind or aft portion. As will be appreciated by those skilled in the art, the blades 8 rock angle, defined as $\theta_r$, will vary continuously to maintain a relative $\alpha_e$ as each blade completes one revolution. A flip axis, defined as the point where the blades flip from $+\alpha_e$ to $-\alpha_e$, i.e., where the control signals are altered, is defined as $\beta$. In the preferred embodiment, $\beta$ was chosen to coincide with an axis located at minus ninety degrees from a wind direction instrument 13 measured wind direction. The blade flipping occurs over thirty degrees of rotor travel, taken at a point located plus fifteen degrees from the flip axis. The blade actuators 11 are according to preselected schedules programmed into a control or processor unit 12, as later described in conjunction with FIGS. 4 and 5.

The rotor 3 is actuated upon the attainment of suitable wind velocity. The system is designed to give near constant RPM at wind velocities of between 10 and 40 miles per hour. The rotor is stopped by cutting off power to the blade actuators 11. Preferably, the blade pivot point is forward of the aerodynamic center of the blade. The blades thus are free to weathervane into the wind, letting the rotor 3 coast to stop. The windmill 1 is then in its standby mode, and is ready to start when the wind velocity again is within limits. In the embodiment illustrated, a brake is provided to stop the rotor 3 in emergency situations. A number of conventional braking means are available for this purpose, and the braking sequence is not described in detail.

In order to control windmill 1 operation, a number of sensors are required, in addition to the generally described wind instruments 10. In particular, the instruments 10 include the wind direction sensor 13 and a wind speed sensor 14. The sensor 13 is required to monitor the location of the blade flip axis, the angle $\beta$ in FIG. 2, so as to define that axis at minus ninety degrees with respect to the direction of wind. The wind speed sensor 14 provides an input signal to the control unit 12 which is used to determined when sufficient wind is available for windmill power generation. The wind speed sensor 14 also provides a signal to the control unit 12 which shuts down the rotor 3 when the wind exceeds predetermined boundary values. In addition to these sensors, an RPM sensor 15 provides feedback to the control unit 12 which is utilized to maintain rotor 3 speed within predetermining limits. A vibration sensor 16, mounted at the top of the fixed tower, is used to shut down the windmill 1 to prevent excessive loads when excessive vibrations are sensed in a horizontal direction. Finally, a rotor 3 position sensor 17 is utilized in conjunction with the wind director sensor for calculating and updating the blade phase angle ψ, shown and defined in FIG. 2.

Figures 4, 5:
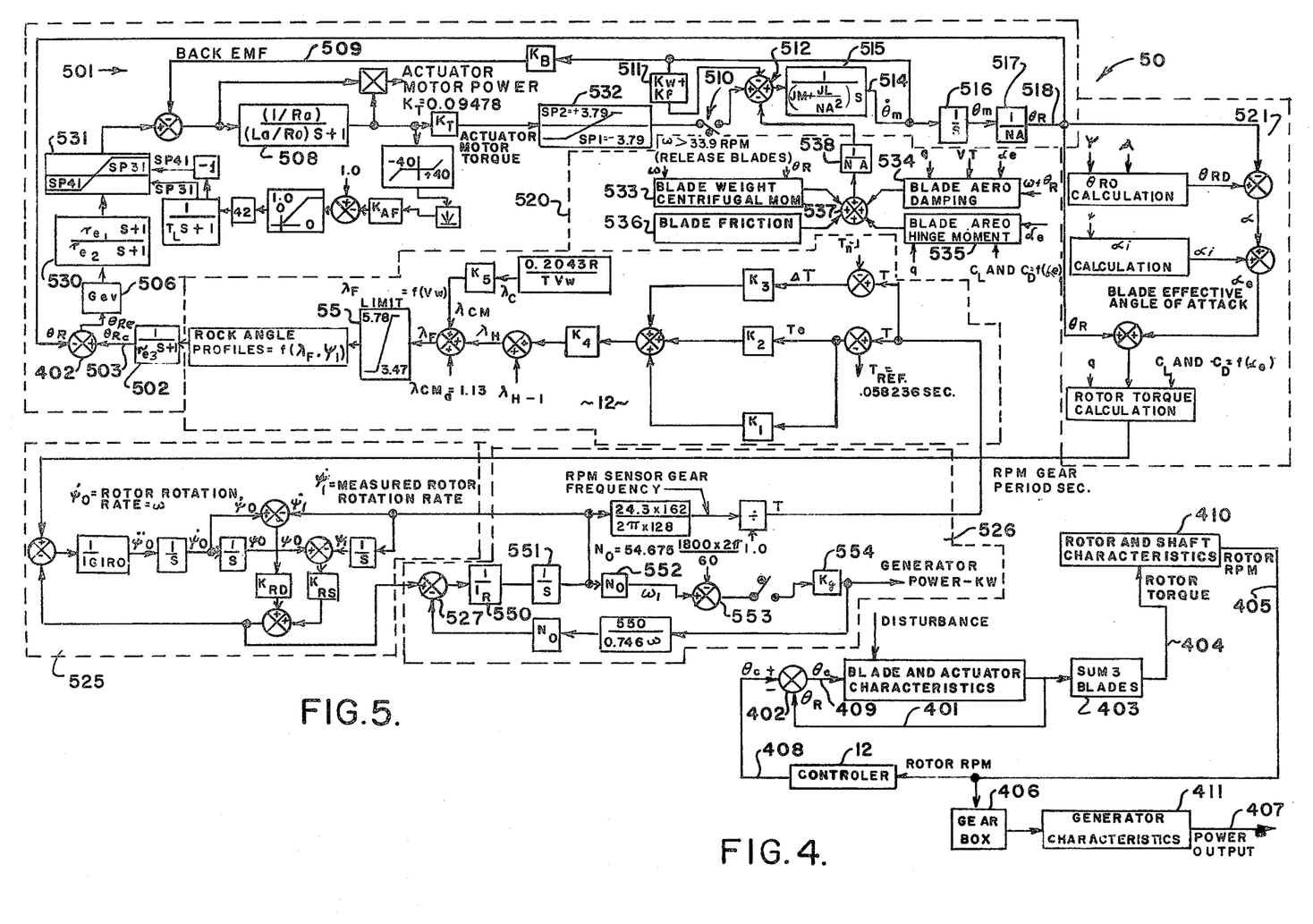
FIG. 4 is a block diagrammatic view, shown in simplified for illustrating the integration of control system of this invention in the operation of the windmill of FIG. 1.
FIG. 5 is a more detailed block diagrammatic view of the control system of this invention and its integration in the operation of the windmill of FIG. 1.

FIG. 4 illustrates a simplified diagrammatic representation of the control system for the windmill 1, which takes into consideration the blade and actuator characteristics, the rotor characteristics, the generator characteristics and the characteristics of the control unit 12. As shown in FIG. 4, a wind disturbance input on the blade causes the rotor to rotate at some speed. The actual blade rock angle ($\theta_r$) is fed back along a line 401 to a summing means 402. The total torque of the rotor 3 is determined from a summation of the total torque for the three blades used in the preferred embodiment. This summation is accomplished at a summing means 403, the summing means 403 having a rotor torque output at 404. The rotor and shaft characteristics are accounted for at 410 to arrive at a rotor RPM at an output 405. The rotor RPM operates a suitable electrical generator through a gear box 406 and the characteristics of the generator and gear box are taken into account at 411 in arriving at the power output for the windmill 1 at an output 407. The rotor RPM is used as an input to the control unit 12. The control unit 12 uses the RPM information to generate a blade rock angle command at output side 408. The rock angle command ($\theta_c$) is an input to the summing means 402. The summing means 402 also receives the actual blade 11 rock angle $\theta_r$ and determines an error signal ($\theta_e$) at an output side 409. The error signal input to the blade actuators 11 sets the desired blade angles for proper operation of the windmill 1.

FIG. 5 is a more detailed block diagrammatic view of the operation of the windmill 1. For purposes of explanation, FIG. 5 may be divided into six sections. The operational explanation is made with reference to a single blade for simplicity purposes. As indicated, three blades actually are employed in the preferred embodiment. A control system 50 includes an actuator section 501. The actuator section 501 is a representation of the structure employed in controlling the blades 8 during windmill operation. The operation of the actuator section is dependent on a series of rock angle profiles, shown in FIG. 3. The rock angle profiles commanded by the control unit 12 are discrete values, commanded in the embodiment illustrated, every 12.8 ms. This creates a step profile which is difficult for the actuator motor drive to follow. The profile is therefore filtered, or made a smooth electrical signal, by a lag circuit 502. The lag circuit 502 requires the rock angle commands in the control unit 12 be offset an angular amount corresponding to the time constant $\tau_{e3}$. The smooth rock angles at an output side 503 are compared to the actual rock angles $\theta_r$ at summing means 402. The output of summing means 402 is a rock angle error $\theta_e$, which is amplified in gain means 506 and a stabilizing network 530 to drive the motors which position the blades 8. The blade drive motor is represented by an inductance, resistance and gain at 508, along with a back EMF input 509. The limiting values SP31 and SP41 at 531 represent the current limiting function of a power amplifier, while the limits SP1 and SP2 at 532 represent motor torque limits. A switch 510, which cuts off the motor torque, represents the blades being released to weathervane. Motor windage and friction, represented by block 511, is combined in a summing means 512 with motor torque. The resultant torque then acts on the motor and load inertia $JM+JL/NA^2$ to obtain motor acceleration, which is integrated at 515 to obtain motor rate at an output 514.

The output 514 is passed through a second integrator 516 to give motor position and by correlating this information with the actuator gear ratio $N_a$ at 517, the blade rock $\theta_r$ is obtained at output 518.

Blade moment components, outlined in phantom lines and represented by the reference numeral 520, represents the simulation of the blade turning moments that must be overcome by the blade actuators.

The individual moment calculations are accomplished at 533, 534, 535 and 536 respectively, summed at 537 and related through the actuator gear ratio at 538 to form an input to summing means 512.

The section that simulates the air flow induced effects and calculates the rotor torque is outlined in area 521 of FIG. 5. The induced effects equation $\alpha_i$ are empirically derived relationships. The air flow induced effects alters the loads on the blades which in turn affects the rotor torque and RPM.

The rotor 3 dynamics section is represented by area 525 in FIG. 5. The area 525 is a standard representation for a torsional spring/inertia system that has a spring contant $K_{rs}$ and a damping constant $K_{rd}$. It is not described in detail.

The generator section is represented by the reference numeral 526 in FIG. 5. The generator output torque is subtracted from the resultant rotor torque from the tower dynamics section 525 at a summing means 527 and is used to act upon the speed increaser and a generator inertia means 550. The resulting acceleration is integrated at 551 and related through the speed increaser gear ratio at 552 to give generator rate. The generator rate minus the synchronous 1800 RPM rate at 553 is related to the generator output by the gain $K_g$ at 554. In the embodiment illustrated, the generator is not connected until the rotor 3 reaches approximately 33 RPM, which is 1800 RPM at the generator.

Rotor rate is also correlated to the RPM sensor 15 output by counting 120 teeth of a 162 tooth gear connected to the high speed side of the speed increaser. This period, which is 58.2 ms at the nominal rotor 3 rate, is used as the input time to the control unit 12. This means that the controller updates the RPM period approximately every 58.2 ms.

The control unit 12 provides for a near constant RPM under varying load and wind conditions. The RPM period, T, is the primary feedback loop. The control unit 12 computes the change in the value of $\lambda_F$ that will correct for any RPM error. $\lambda_F$ is the specific rock angle profile (sometimes referred to herein as cam $\lambda_F$) that is commanded by the control unit 12. The various cam or rock angle profiles are shown in FIG. 3. $\lambda_F$ relates to the blade speed ratio (blade speed due to rotor rotation divided by wind speed) that would provide the correct effective angle of attack ($\alpha_e$) to maintain correct rotor RPM for the wind speeds listed in FIG. 3. The rock angle profiles are stored in a suitable memory means and the control unit 12 interpolates between stored values to define the blade rock angles as a function of blade phase angle, ψ.

Five controller gains, $K_1$ through $K_5$, are employed. Values, in the embodiment illustrated, are:

$K_1=0$, $0 \leq \omega \leq 7.17$ RPM
$K_1=0.7324$, $7.17 \leq \omega \leq 29.98$ RPM
$K_1=0$, $\omega > 29.98$ RPM
$K_2=0$, $0 \leq \omega < 29.98$ RPM
$K_2=3.479$, $\omega \geq 29.98$ RPM
$K_3=0$, $0 \leq \omega < 29.98$ RPM
$K_3=48.875$, $29.99 \leq \omega < 32.66$ RPM $K_3 = 117.1875, \omega \geq 32.66$ RPM
$K_4 = 0, 0 \leq \omega \leq 7.17$ RPM
$K_4 = -5.0, \omega > 7.17$ RPM
$K_5 = 0.5$ Gain $K_1$ is used only for start up. It is an integral gain constant that solely brings the rotor 3 up to a speed of 30 RPM. Note, in FIG. 3, that up to 7 RPM only cam $\lambda_F$ equals 1.13 is used, $K_1$ starting to integrate to higher $\lambda_F$ cams after that point. Gains $K_2$ and $K_3$ are the integral and proportional gains normally controlling the device 1. They take over from the start up gain $K_1$ when 30 RPM is reached. Gain $K_4$ is a general gain that multiplies $K_1$, $K_2$ and $K_3$.

Gain $K_5$ relates the actual measured blade speed ratio command value to be summed with the RPM feedback value. This feature is used to anticipate the rock angle corrections necessary to accommodate wind gusts. The actual values for the gains may vary with application.

Figure 6:
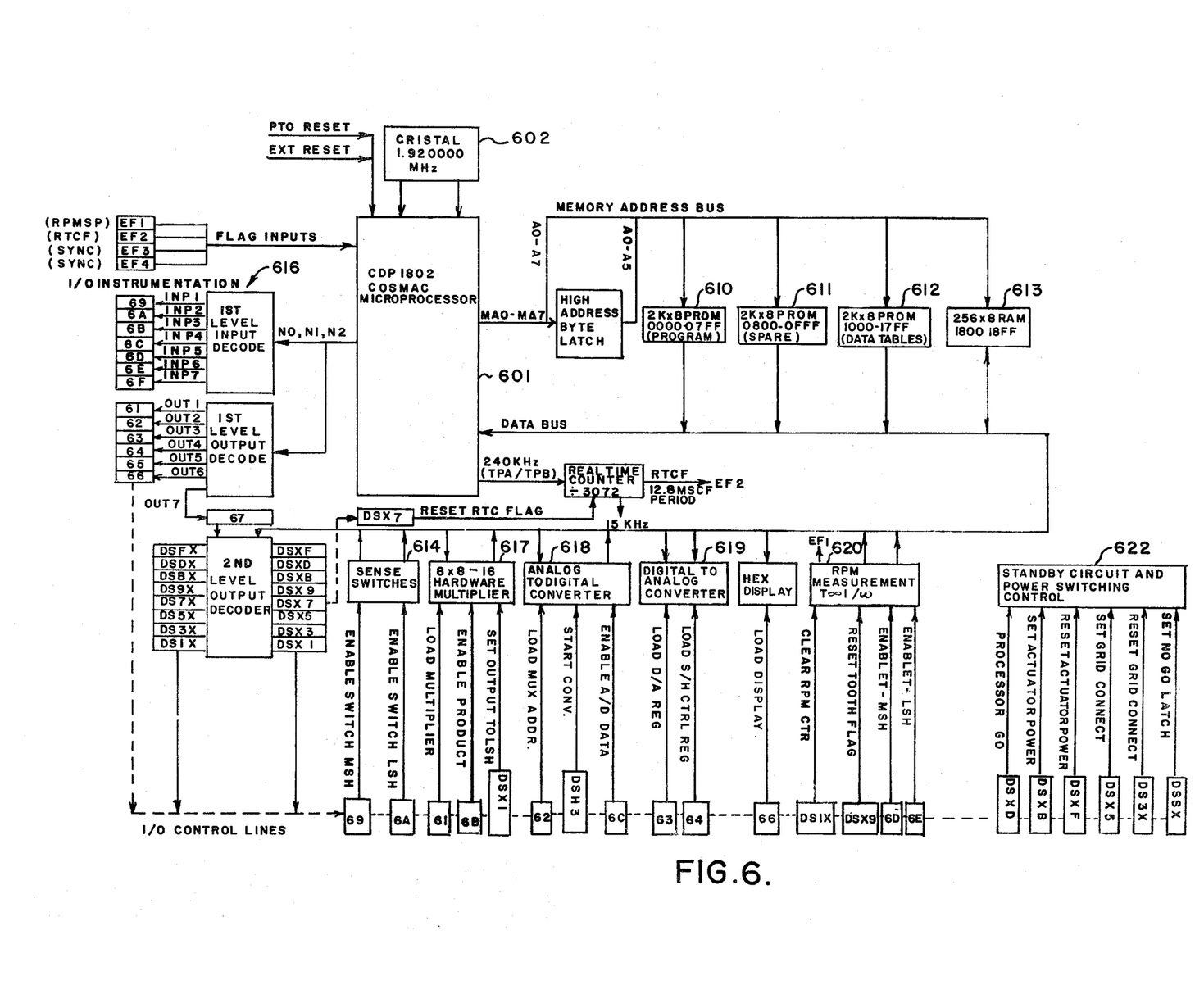
FIG. 6 is a block diagrammatic view of a control processor employed with the control system shown in FIG. 5.

FIG. 6 is a block diagrammatical view of the control unit 12 processor function diagram. The control unit 12 utilizes an eight bit CMOS microprocessor 601, for example, an RCA CDP1802 in conjunction with input/output interface circuits to perform the control unit 12 functions for the entire device 1. The microprocessor program is resident in programmable read only memories (PROMS). Provisions are made for 6144 words of PROM resident in three 2K×8 bit PROMs, for example, available under Intel number 2716 represented by the reference numerals 610, 611 and 612 respectively, in FIG. 6. Scratchpad memory is provided as 256 words of random access memory storage (RAM) represented by the reference numeral 613. As can be appreciated, an accurate RPM measurement is needed. The time base for RPM measurement is a 240 Khz frequency derived from a crystal controlled oscillator 602. FIG. 6 also shows the method of connecting the functional input/output modules to the processor's data bus. Input/Output (I/O) control lines are activated by processor commands. Control lines labelled "DSXY" generate discrete strobes such as set and reset commands. Sixteen sense switches 614 implemented as two 8-element DIP assemblies provide for manual inputs and tests. The most significant half of these switches controls the operating mode. The least significant half of these switches selects which RAM variable is transmitted to the hex display 615 and instrumentation analog output, indicated generally by the reference numeral 616.

Multiplication is performed by a large scale integration (LSI) multiplier 617 circuit connected via the microprocessor data bus, thus eliminating time consuming software multiplication. Analog to digital converstion is implemented by a programmable front end multiplexer plus an eight bit analog-to-digital (A/D) converter 618. The multiplexer is configured for three different analog inputs plus ten single ended inputs. Two analog outputs are used to monitor reference inputs for diagnostic tests. A single digital-to-analog (D/A) converter 619 drives four sample and hold circuits. Three circuits provide rock angle commands to the three blade actuators 11 and also provide an analog output for instrumentation monitoring.

The time base for RPM measurement is a 240 kilohertz frequency derived from the processor's 1.92 microhertz crystal-controlled frequency. A 16 bit binary counter 620 accumulates the number of time base periods which occur during the time inteval required for 128 cycles of the RPM sensor. Each 128th cycle of the RPM sensor transfers the content of the counter to a holding register and sets a flag which signals the processor to read out the contents of the register.

Figure 7:
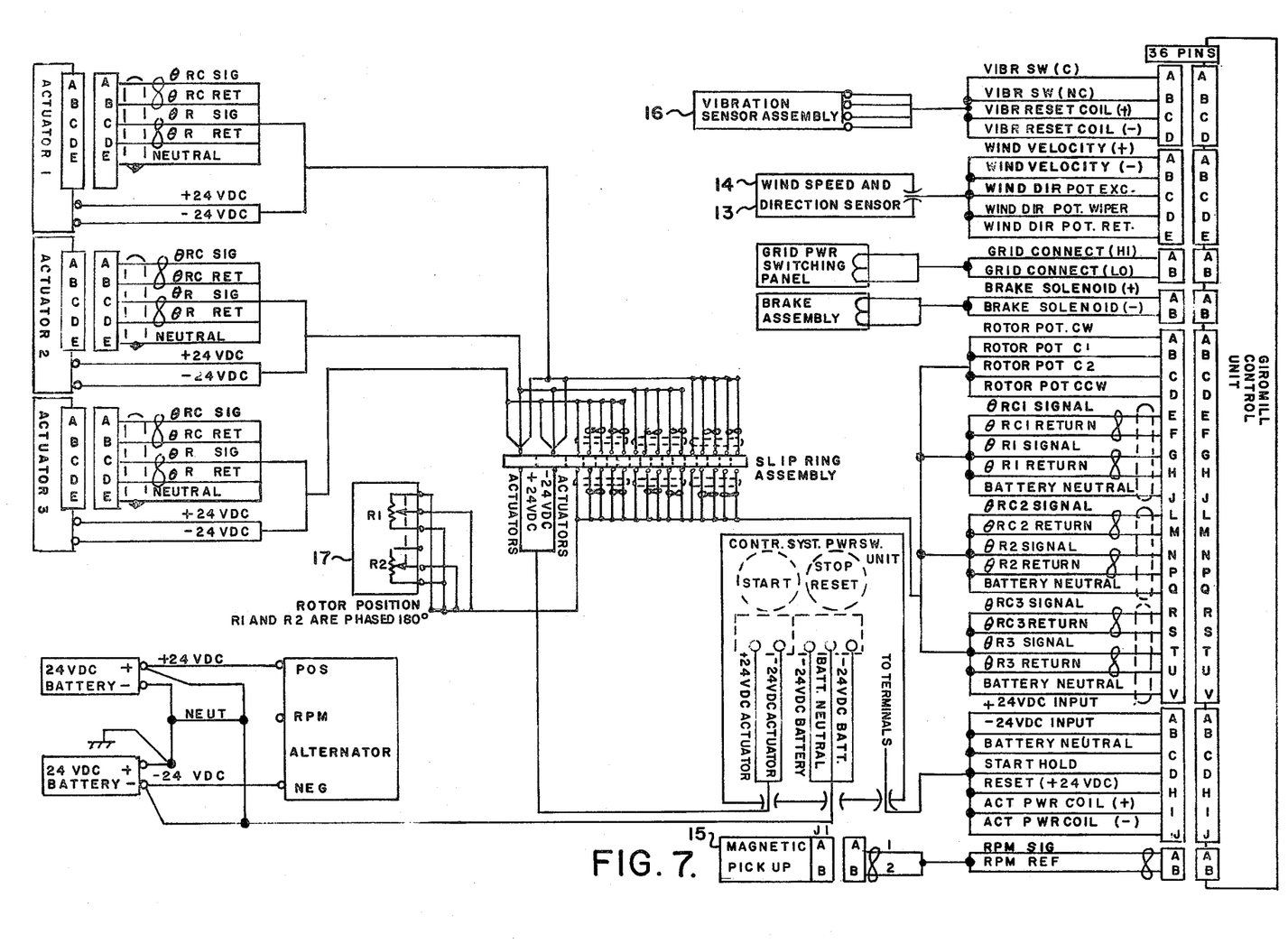
FIG. 7 is a connection diagram for the control system shown in FIG. 5.
Figures 8, 9:
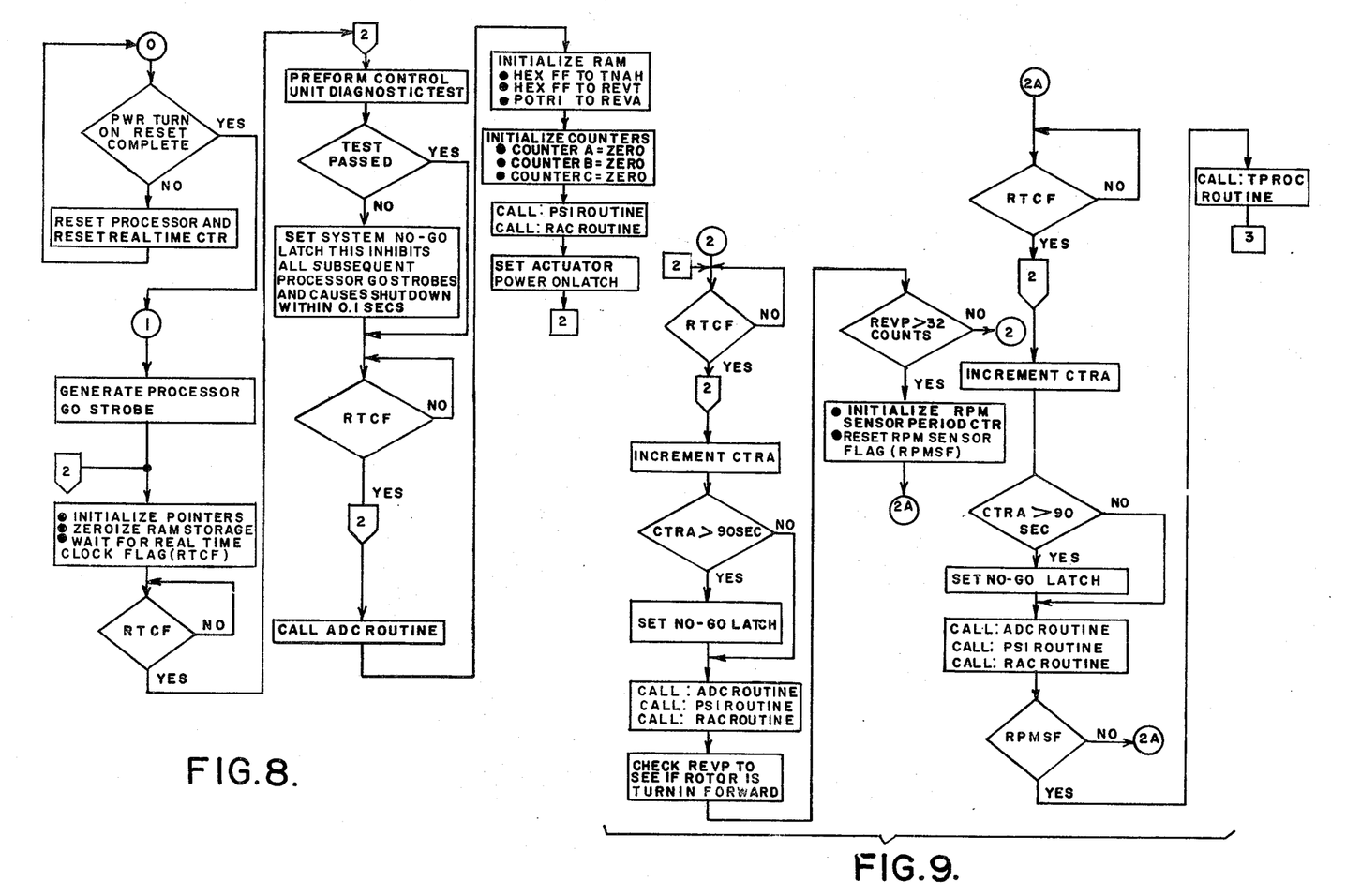
FIGS. 8, 9, 10 and 11 are flow diagrams for the control processor functions performed by the control processor shown in FIG. 6.
Figure 10:
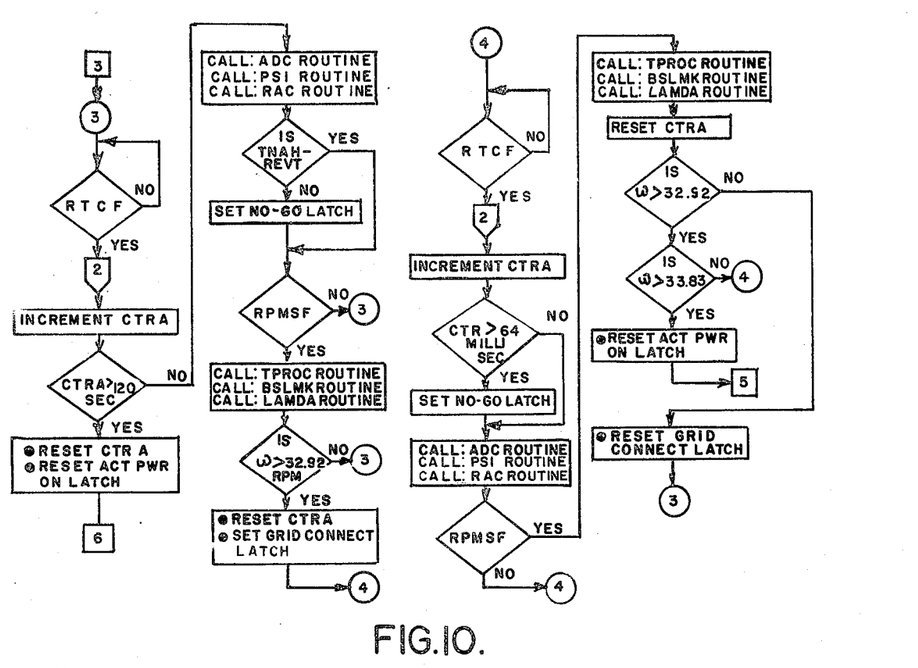
Figure 11:
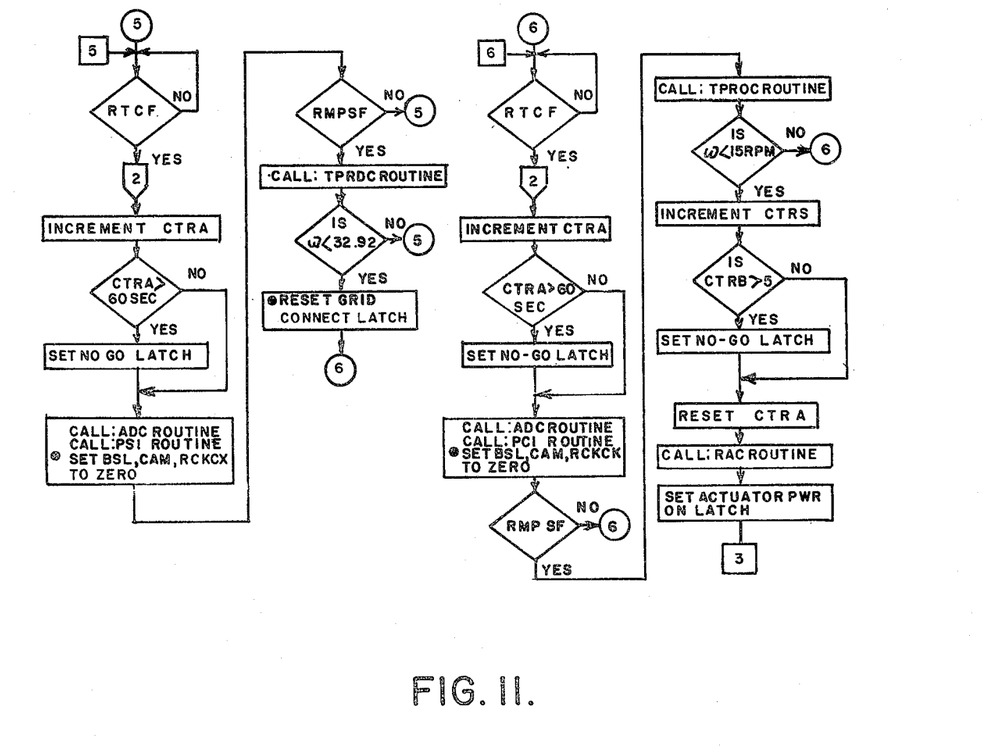

The control system wiring schematic is shown in FIG. 7. As indicated, sensor inputs to the control unit are signals from a wind speed sensor 14, a wind direction sensor 13, a vibration sensor 16, an RPM sensor 15, and a rotor position sensor 17.

The wind speed sensor 14 input is an ac voltage with amplitude proportional to wind speed. The sensor scale is 10 volts ac at a wind speed of 100 MPH. The ac voltage is converted to dc voltage in the control unit's standby circuits, indicated by reference numeral 622 in FIG. 6. The dc voltage, which is proportional to wind speed, is amplified and output to analog comparator circuits. It is also made available to the processor's analog-to-digital converter input if processor power is on.

Figure 12:
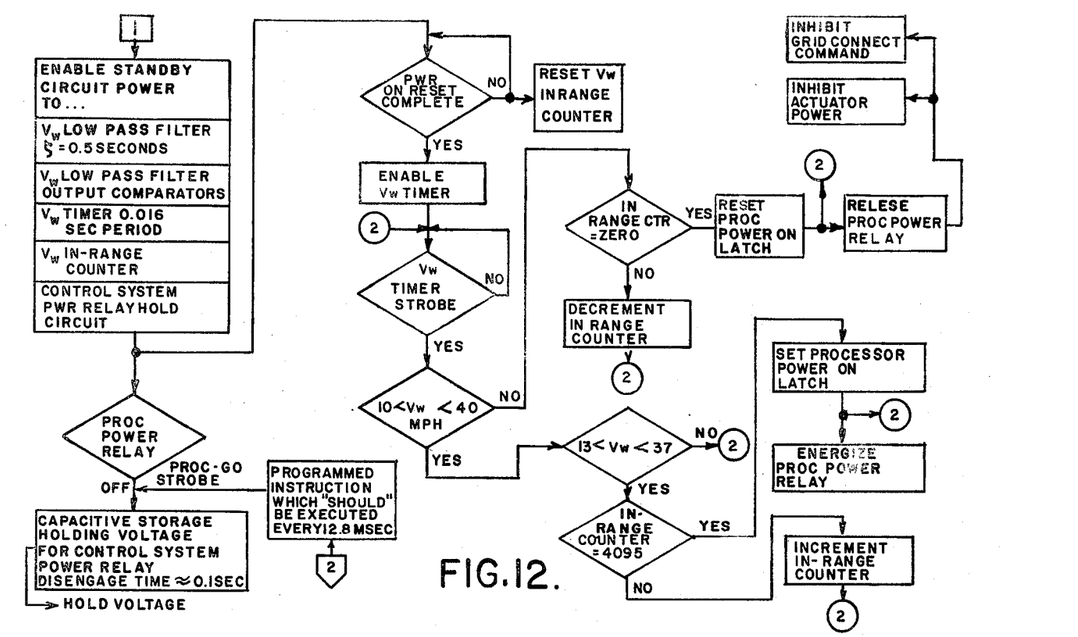
FIG. 12 is a flow diagram for the wind speed sensing diagram of the control system processor function shown in FIG. 6.

Four analog comparators with adjustable thresholds enable digital filtering of the wind speed input in accordance with the flow diagram shown in FIG. 12. The time delay of the digital filter is controlled by the counter sampling frequency, which is potentiometer adjustable. The initial setting provides a time delay of about one minute.

The wind direction sensor 13 is activated by a potentiometer which is excited by the 10 v dc reference in the processor's analog-to-digital circuitry. The wiper signal from the potentiometer is converted to digital data via the multiplexer and digital-to-analog converter, and stored in RAM memory for subsequent processing.

The vibration sensor 16 contains a set of contacts which open in the presence of excessive vibration. These contacts are in seriers with the control unit's dc voltage input line and shut down the system. A reset coil enables remote reset when the operator presses the stop/reset push button on the control system power switching unit.

The RPM speed sensor 15 input is activated by a magnetic pick up element which senses gear teeth and provides an output frequency equal to 3936.6 times rotor 3 frequency. In the control unit, the magnetic pick up signal is terminated by a differential line receiver, which converts the low level signals to the logic level signals required by the RPM measurement circuits.

The rotor position sensor 17 input is sourced by dual potentiometers, which rotate on a 1:1 ratio with the rotor. The potentiometers are excited by the 10 volt dc reference in the control unit. The potentiometer wipers are connected to the A/D input multiplexer, converted to a digital signal, and stored in RAM memory. Dual potentiometers, phased 180° apart, are utilized to avoid dead band ambiguity which occurs at potentiometer endpoints for a span of approximately 10°. The microprocessor's program determines which potentiometer is in the unambiguous region and utilizes that output to determine rotor position.

The control unit 12 sends rock angle commands to three actuators and receives rock angle position feedback signals for use in monitoring the respective blade actuator 11 operation. If the feedback rock angles are not uniquely related to the commanded rock angles, it indicates a possible actuator 11 or blade 8 hang up, and the controller will shut down the windmill. The rock angle command is a dc voltage corresponding to a rock angle range of ±63.5 degrees.

The control unit's program resides in programmable read only memories (PROMS). Referring again to FIG. 6, three PROMS are provided (although only two are presently used) for program and fixed data tables. As indicated, the PROMS preferably are Intel 2616's and each PROM has a capacity of 2048 eight bit words. These PROMS are field reprogrammable but require a knowledge of the microprocessor's machine language coding.

The software program for the control system consists of a main program plus subroutines and look-up tables.

Loop-up tables primarily consist of computer-generated rock angle profiles, as shown in FIG. 3. Each profile is stored in memory as a function of blade phase angle. Successive profiles are stored as a function of blade speed ratio. Memory storage is thus analogous to a three dimensional cam.

Figure 13:
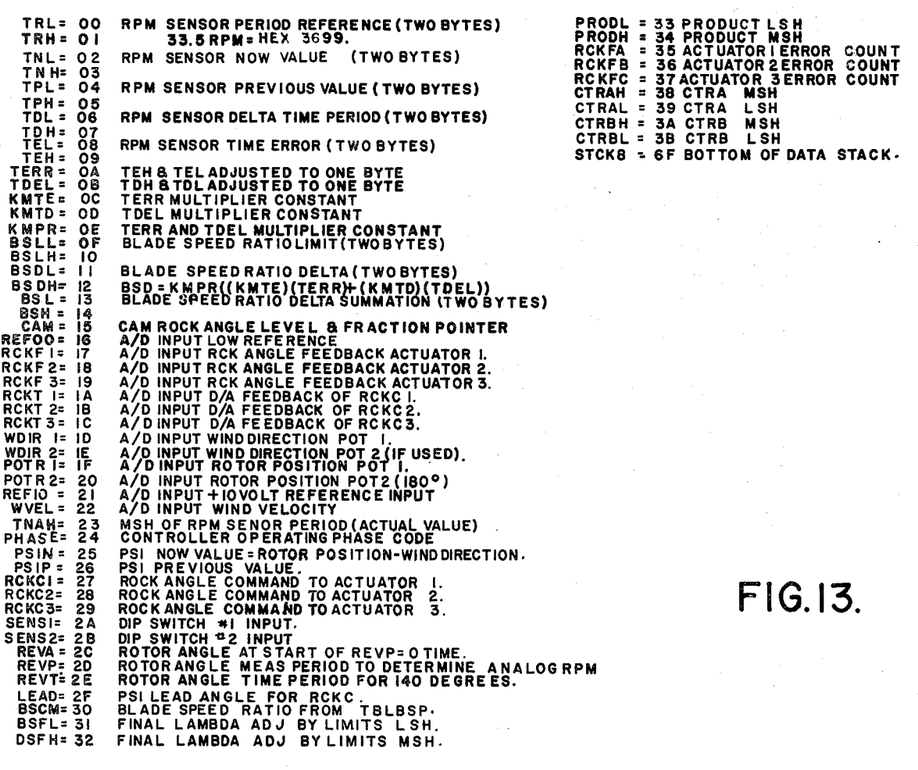
FIG. 13 is a symbol definition chart defining various program parameters.

The main program is sequenced by operating phase, which is related to rotor RPM. The main program is shown in FIGS. 8, 9, 10 and 11. Circle numbers on the flow diagrams correspond to phase sequence numbers. The phase sequence numbers are explained in FIG. 15. The "set no-go latch" blocks relate to various no-go checks performed during windmill 1 operation. The no-go checks are shown in FIG. 14. Software symbols and sense switch settings to display the value are defined in FIG. 13.

Subroutines called by the main program are as follows:

ADC Routine—This routine controls the conversion of all analog inputs to digital data. Each analog input conversion consists of setting up the input multiplexer followed by a processor-controlled "start convert" command. After each conversion the A/D output is stored in fixed locations of RAM memory to be utilized by the main program or other subroutines.

PSI Routine—This routine calculates the rotor angle relative to wind direction and stores the difference in RAM as PSIN. Prior to storing the PSI angle, a lead angle which is proportional to RPM is added to the PSI angle. This routine additionally calculates RPM based on data values of rotor position potentiometer inputs. This RPM value is stored in RAM as REVT and is utilized by the main program for error check comparison with RPM sensor values.

RAC Routine—This routine is the rock angle command routine. Input variables CAM and PSIN are utilized to generate RCKC1, RCKC2 and RCKC3. The routine also loads the rock angle output converters.

TPROC Routine—This routine inputs data from the RPM measurement circuitry and generates RAM variables TERR, TDEL, and TNAH.

BSLMK Routine—This routine is the blade speed limit and multiply constant routine. It utilizes look-up tables to generate KMPR, KMTD, KMTE, and LEAD as a function of RPM and to also store BSLH and BSLL as a function of wind speed.

LAMBDA Routine—This routine calculates delta lambda by the following equation BSD=KMPR ((KMTE) (TERR)+(KMTD) (TDEL)). The routine calculates (WVEL) (TNAH) and utilizes the resulting product to look up BSCM. RAM variables stored by the routine are BSDL, BSDH, BSL, BSH, CAM, BSCM, BSFL, and BSFH.

The windmill rock angle actuator 11 is a self-contained servomechanism which controls the angular position of the output shaft in response to an input position signal. The servo mechanism consists of an electronic control amplifier and a DC motor powered, direct drive actuator. The prime mover for the rock angle control actuator is a conventional DC motor, operating from the 48 volt supply. Preferably, the motor is a permanent magnet motor mechanically commutated through four brushes on a 42 bar commutator.

Operation of the windmill of this invention is relatively simple to understand. Windmill 1 start up must be done using battery power. Due to the variability of the wind, a start up could commence only to be terminated because the wind speed dropped off. Having this occur several times can run down the battery, resulting in an inoperative installation until the batteries are recharged. To prevent false starting, an yet keep wind start up speed low, the dual wind speed level logic was implemented. The wind speed sensing flow diagram is shown in FIG. 12. Upon the determination that wind speed is sufficient for power generation, the control unit 12 begins generating rock angle commands and the windmill 1 will operate in accordance with the description given above. Command rock angles are updated every microprocessor computation cycle; in this case, 12.8 milliseconds. This causes discrete rock angle commands which must be filtered to prevent a limit cycle actuator operation. The filter circuit has a time constant or lag of approximately 0.075 seconds. At the nominal rotor rotation rate of 33.5 RPM, this means that the rock angle commanded values would lag about 15° in actual rotor angle travel. To correct this, the rock angle commands are given a rotor angle lead proportional to the rotor RPM, which reaches 15° when nominal rotor RPM is obtained. This results in the optimum rock angle modulation at wind speeds below 20 MPH allowing maximum power to be extracted from the wind.

When the wind speed is below 20 MPH full RPM (and hence full power) cannot be had. Under these conditions the controller would keep commanding an increase in the rock angle cam profile until the limit value of cam 10 is reached. The blades would, therefore, be modulated at a non-optimum rock angle (winds about 12 MPH and below 20 MPH) and reduced power output would result. To prevent this, a rock angle cam limit is established as a function of measured wind speed. This limits the rock angle cam profile to correspond to the wind speed values shown in FIG. 3. This limiting is accomplished in block 55 of FIG. 5.

As will be appreciated, wind speed is a highly variable quantity. Any rotary wind energy device placed in this environment will experience RPM and/or power fluctuations due to wind gusts. A quick acting control system is necessary to keep the rotor RPM to the close tolerances necessary for satisfactory operation and prevent rotor overspeed and generator power drop out. In the invention described above, this is achieved by having the RPM error feedback through a proportional plus integral gain, which is summed with the measured blade speed ratio. The resultant signal is then used to command the rock angle cam value. The addition of the measured blade speed ratio loop enhances the control response. It inserts revised rock angle cam values that start counteracting the wind gusts prior to the gust even producing an RPM error. Only half value of the measured blade speed ratio is used ($K_5=0.5$) since the measured wind speed may not be the same as the actual speed acting over the rotor.

In addition to wind speed gusts, the wind also will change direction rapidly. These rapid variations in wind direction must be accommodated by the control system so as to maintain the blade rock angles at their optimum setting. Wind direction relates to the blade phase $\psi$. This angle is measured, in the rotor rotational direction, from the wind vector to the blade position. This is used as a direct input in the blade rock angle profiles for choosing the correct profile for operation.

It thus may be observed that a windmill meeting all the ends and objects hereinabove set forth has been described and shown in the drawings and accompanying description.

Numerous variations, within the scope of the appended claims, will be apparent to those skilled in the art in light of the foregoing description and accompanying drawings. Thus, while a particular windmill design was shown, my invention, in its broader aspects, is compatible with a number of windmill designs. Likewise, while a three blade rotor is shown, other rotor configurations can be employed. Specific design parameters discussed above, and the particular components utilized in the design are for informational purposes only, and are not intended in a limiting sense. Other design criteria may be employed, if desired. While an electrical blade actuation control system was described, those skilled in the art will recognize that a hydraulic system can be substituted, if desired. These variations are merely illustrative.

Having thus described the invention, what is claimed and desired to be secured by Letters Patent is:

1. In a windmill including a support means, a rotor assembly rotatably mounted to said support means, said rotor assembly including a plurality of blades movably mounted to said rotor assembly and rotatable therewith, the improvement comprising a control system for controlling the windmill operation, said control system including means for adjusting the angle of attack of said blades during rotation of the rotor assembly, a processor having memory associated with it, a plurality of different rock angle profiles stored in said memory, each of said rock angle profiles corresponding to a pattern of predetermined blade positions for an orbit of said blade based upon a particular available wind speed, and means for selecting the optimum rock angle profile based on the rotational speed of said rotor assembly, said processor providing an electrical signal output corresponding to said selected rock angle profile.

2. The windmill of claim 1 wherein said windmill is a vertical axis windmill.

3. The windmill of claim 2, further including actuator means for positioning said blade operatively connected to said adjusting means.

4. The windmill of claim 3 further including filter means for providing a smooth electrical signal to said actuator means.

5. The windmill of claim 4 wherein said actuator means include a servo mechanism.

6. The windmill of claim 4 wherein said processor includes means for providing an electrical signal corresponding to a lead angle to the electrical signal provided to said actuator means so that the rock angle electrical signal corresponds to the actual position of said blade.

7. The windmill of claim 6 wherein said processor includes means for limiting the electrical signal output positioning said actuator means to the rock angle profile values stored in said memory.

8. The windmill of claim 7 wherein said control system further includes means for preventing the application of power input to said actuator means until the wind speed reaches a predetermined velocity.

9. The windmill of claim 8 wherein said control system further includes means for monitoring rotor assembly operation and removing power to said actuator means upon the occurrence of at least one of a plurality of predetermined conditions.

* * * * *